United States Patent
Papp et al.

(10) Patent No.: US 8,761,043 B2
(45) Date of Patent: Jun. 24, 2014

(54) SETTING UP A VIRTUAL PRIVATE NETWORK

(75) Inventors: Oktavian Papp, Tinnye (HU); Attila Mihaly, Dunakeszi (HU); András Csàszàr, Budapest (HU); Lars Westberg, Enköping (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 580 days.

(21) Appl. No.: 12/811,758

(22) PCT Filed: Jan. 9, 2008

(86) PCT No.: PCT/EP2008/050178
§ 371 (c)(1),
(2), (4) Date: Jul. 6, 2010

(87) PCT Pub. No.: WO2009/086931
PCT Pub. Date: Jul. 16, 2009

(65) Prior Publication Data
US 2010/0284305 A1 Nov. 11, 2010

(51) Int. Cl.
*H04L 12/28* (2006.01)
(52) U.S. Cl.
USPC .......................................... 370/254; 370/401
(58) Field of Classification Search
None
See application file for complete search history.

(56) References Cited

U.S. PATENT DOCUMENTS

| 6,339,595 | B1 | 1/2002 | Rekhter et al. |
| 7,283,563 | B1 | 10/2007 | Allan |
| 2009/0116483 | A1* | 5/2009 | Anumala et al. ............... 370/392 |
| 2010/0284305 | A1* | 11/2010 | Papp et al. ...................... 370/254 |
| 2011/0286466 | A1* | 11/2011 | Ge et al. .......................... 370/401 |
| 2012/0170578 | A1* | 7/2012 | Anumala et al. ............... 370/390 |

OTHER PUBLICATIONS

International Search Report for PCT/EP2008/050178, mailed Oct. 8, 2008.
Semeria, C., "RFC 2547bis: BGP/MPLS VPN Fundamentals", Whitepaper Juniper Networks, (Jan. 1, 2001), pp. 1-38.
Rosen et al; "BGP/MPLS IP Virtual Private Networks (VPNs)", Feb. 2006, RFC 2547 pp. 1-47.
RFC 2283: Bates et al, Multiprotocol Extensions for BGP-4, Feb. 1998, pp. 1-10.
Knight et al, "Network based IP VPN Architecture Using Virtual Routers", Network Working Group Internet Draft, draft-ietf-l3vpn-vpn-vr-03.text, Mar. 6, 20006, pp. 1-24.
Ould-Brahim et al, "Using BGP as an Auto-Discovery Mechanism for VR-based Layer-3 VPNs", L3VPN WG, draft-ietf-l3vpn-bgpvpn-auto-08.txt, Sep. 2006, pp. 1-12.
RFC 3107: Rekhter et al, "Carrying Label Information in BGP-4", Network Working Group, May 2001, pp. 1-9.

(Continued)

*Primary Examiner* — Robert Wilson
(74) *Attorney, Agent, or Firm* — Nixon & Vanderhye, P.C.

(57) ABSTRACT

A method for setting up a VPN is described. The VPN is set up in a backbone network having a plurality of PE routers for controlling the transfer of IP traffic to and from CE routers in satellite networks. In a PE router, a VRF is configured for the VPN and populated with local routes for the VPN. A VRF IP loopback address is assigned for the VRF, and a PE IP loopback address is assigned for the ingress PE router. A local route with the VRF and PE IP loopback addresses is then advertised to other PE routers in the backbone network.

22 Claims, 6 Drawing Sheets

(56) References Cited

OTHER PUBLICATIONS

Rajagopal, "Building Trusted VPNs with Multi-VRF", Foundry Networks, Inc., 2006, pp. 1-5.

Avaya Solution & Interoperability Test Lab, "Configuring VPN Routing and Forwarding (VRF) on Juniper J4300 Router and Cisco 3550 Catalyst Multi-Layer Switch to Support Avaya IP Telephony—Issue 1.0", pp. 1-23. http://www.avaya.com/uk/emea/en-us/resource/assets/applicationnotes/vrf_jun-cis.pdf, 2006.

IEEE 802.1Q, IEEE Standard for Local and Metropolitan Area Networks, "Virtual Bridged Local Area Networks", 2005, pp. 1-303.

* cited by examiner

SETTING UP A VIRTUAL PRIVATE NETWORK

This application is the U.S. national phase of International Application No. PCT/EP2008/050178 filed 9 Jan. 2008 which designated the U.S., the entire contents of which is hereby incorporated by reference.

TECHNICAL FIELD

The technology described herein relates to a method and apparatus for setting up a virtual private network. In particular, the apparatus relates to a method for providing routing and addressing information in virtual private networks.

BACKGROUND

Many enterprises operate from a number of different locations. They may have networks such as Local Area Networks (LANs) operating at each location. It is often desirable for such enterprises to interconnect these "satellite" networks so that all users can access resources from all of the satellite networks. To such users, it would appear that the enterprise operates a single network incorporating all of the satellite networks.

This can be facilitated by the use of a Virtual Private Network (VPN). A VPN is a communications network "tunnelled" through another network. One common application is secure communications through the public Internet, but many other applications can be envisaged.

Different VPN service models have been proposed over the last several years in order to satisfy diverse requirements. These models include traditional Frame Relay or Asynchronous Transfer Mode (ATM) VPNs, customer equipment based VPNs, such as those using Layer 2 Tunnelling Protocol (L2TP) and/or IP Security (IPSec) and provider provisioned VPNs (Layer 2 (L2) and Layer 3 (L3) VPNs). In the provider provisioned network based L3 VPNs, Provider Edge (PE) routers contain the VPN functionality needed to transfer L3 (IP) traffic between different sites of a customer.

L3VPN technology has many potential uses, including in the Internet. Furthermore, the 3rd Generation Partnership Project (3GPP) is discussing a Long Term Evolution (LTE) wireless communication standard, in which the core network architecture is known as System Architecture Evolution (SAE). The backbone networks for this architecture may well be IP-based, and it can be envisaged that VPNs may be required for applications such as core network nodes for signalling or Operations, Administration and Maintenance (OAM) traffic; base stations for radio signalling or OAM traffic; base stations, SAE Gateways (GWs) and Mobility Management Entities (MMEs) within the same pool; all non-3GPP serving nodes; fixed access edge routers; and Video on Demand (VoD) servers and clients.

Figure 1:
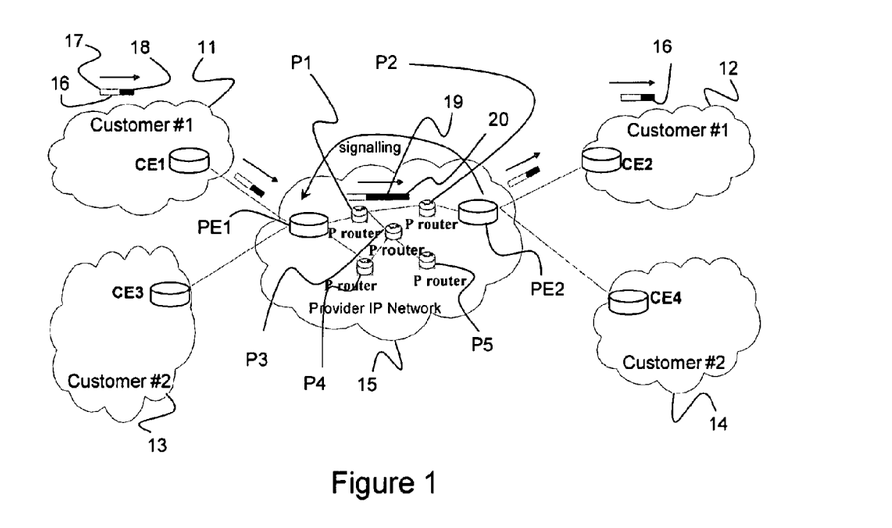
FIG. 1 is a schematic illustration of a provider provisioned L3 VPN architecture.

FIG. 1 depicts a general schematic view of a PE-based, provider provisioned L3 VPN architecture. Four LANs 11-14 are connected to a provider's IP network (backbone network) 15. Two of the LANs 11, 12 belong to a first customer, and are linked to provide a first VPN. The other two LANs 13, 14 belong to a second customer, and are linked to form a second VPN. Each LAN includes a Customer Edge (CE) router CE1-CE4. The backbone network 15 includes two PE routers PE1, PE2, to which the CE routers CE1-CE4 are connected. The backbone network further includes Provider (P) routers P1-P5 that forward data (including VPN data), but which do not provide VPN functionality to the CE routers CE1-CE4.

An IP packet 16 is sent from a source node (not shown) within a LAN 11 belonging to the first customer, and is intended for a destination node (also not shown) within the other LAN 12 of that customer. The packet 16 contains an IP payload 17 and destination IP address information 18. The packet 16 is sent from the CE router CE1 at the edge of the LAN 11 to an "ingress" PE router PE1. The package is encapsulated, and inner and outer headers 19, 20 added, to route it, via P routers P1, P2 to an egress PE router PE2. At the egress router PE2 the inner and outer headers 19, 20 are removed. The packet is then forwarded to the CE router CE 2 at the edge of the second LAN 12, and on from there to the destination node within the second LAN.

Two provider-provisioned L3VPN solutions have been proposed in recent years. The first is the Border Gateway Protocol/Multi-Protocol Label Switching (BGP/MPLS) VPN described in RFC 4364 and U.S. Pat. No. 6,339,595. The second is the Virtual Router based IP VPN described in the ietf draft "Network based IP VPN Architecture Using Virtual Routers", March 2006.

Two issues have to be handled by a "provider provisioned" L3 VPN, such as that shown in FIG. 1. The first issue is that the addressing within VPN sites (e.g. the LANs 11, 12 shown in FIG. 1) may be such that their private address spaces overlap. The second issue is that P routers are not aware of VPN addressing and are not directly capable of routing traffic to a VPN internal address.

The first issue means that the IP header's destination field of the packet received from a customer is not enough to route the packet. Overlap is handled using different forwarding tables (Virtual Routing and Forwarding tables (VRFs)) for different VPNs and encapsulating (tunnelling) VPN data packets (using the inner header 19 shown in FIG. 1). Based on the inner header 19, the egress PE router PE 2 can look up the packet destination address in the appropriate VRF. In the BGP/MPLS VPN this inner header 19 is an MPLS label, while in the Virtual Router based VPN any encapsulation method can be used (e.g. IP-in-IP, IPSec, Generic Routing Encapsulation (GRE)). However, the main difference between these methods is how PE routers exchange routes of a particular VPN.

Figure 2:
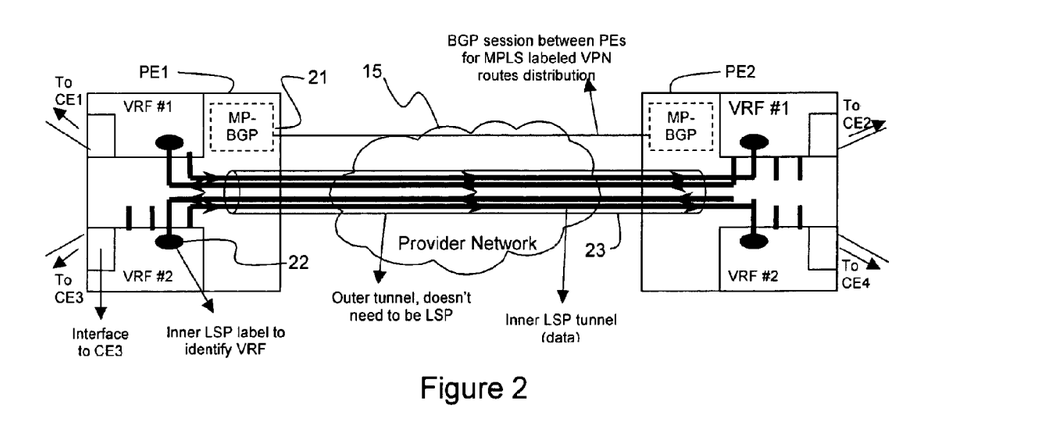
FIG. 2 is a schematic illustration of a BGP/MPLS VPN.

FIG. 2 is a schematic illustration of a BGP/MPLS VPN arrangement. Similar elements to those of FIG. 1 are represented with the same reference numerals. VPNs for two customers (#1 and #2) are shown. The ingress and egress PE routers PE1, PE 2 are connected to the CE routers CE1-CE4 (not shown in FIG. 2). Each PE router contains a VRF (#1, #2) for each VPN (#1, #2). BGP with Multiprotocol Extensions (MP-BGP, described in RFC 2283) 21 is used to exchange routes for each VPN (#1 or #2). This involves exchanging the routes using the VPN-IPv4 address family. This address family contains, besides an IPv4 address field, a Route Distinguisher (RD) field which is different for each VPN. This ensures that, if the same address is used in several different VPNs, it is possible for BGP to carry several completely different routes to that address, one for each VPN. The relevant VRF is identified by an inner Label Switched Path (LSP) label 22 which is appended to the IP packet.

Figure 3:
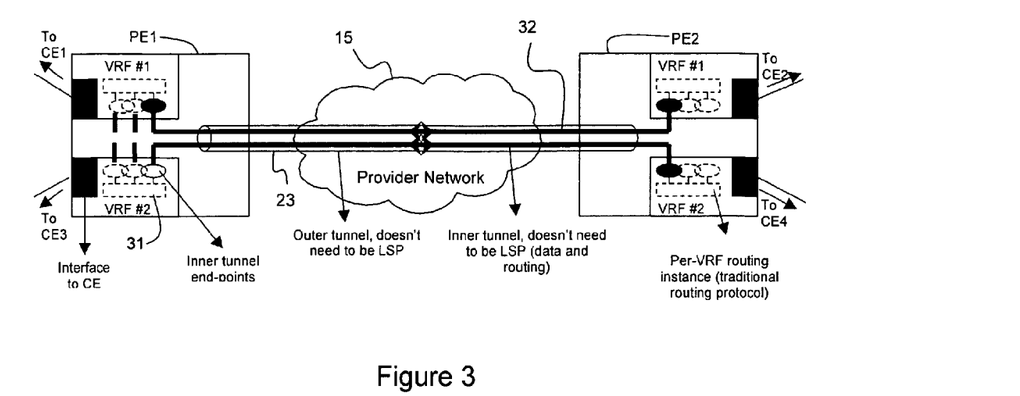
FIG. 3 is a schematic illustration of a virtual router based VPN'

FIG. 3 is a schematic illustration of a Virtual Router (VR) based VPN arrangement. In this case, not only a VRF is allocated for each VPN, but a whole routing instance 31 that emulates all the functionality of a physical router. Routing information is exchanged between VRs of the same VPN using the same tunnels 32 as those used by VPN data flow. Therefore the forwarding tables of virtual routers can be populated using any standard routing protocol (e.g. BGP, Open Shortest Path First (OSPF), Intermediate System to Intermediate System (IS-IS)). However in order to enable a PE to dynamically discover the set of remote VRs which are in common VPNs, and in order to discover the connectivity between these VRs, BGP-4 multiprotocol extensions have also been proposed in "Using BGP as an Auto-Discovery Mechanism for VR-based Layer-3 VPNs", September 2006. These are similar to the BGP/MPLS VPN solution discussed above.

The second issue that has to be handled by a provider provisioned L3 VPN is that P routers should not maintain VPN site related routing information, i.e. packets cannot be routed based on VPN sites' private IP addresses. Using only the inner header for this purpose, the number of routing states in P routers would be related to the number of VPNs and the number of their sites. In order to overcome this, in both VPN solutions an outer tunnel 23 is proposed, and any encapsulation method can be used for this purpose (e.g. MPLS, IP-in-IP, GRE, IPSec).

A special case of the Virtual Router based VPN is when PE routers are directly connected using an Ethernet network. In this case the outer header is not needed and the virtual LAN (VLAN) tag (defined in IEEE 802.1Q) can be used as an inner header in order to separate the VPNs in the provider's network. This architecture can be achieved for instance with current Juniper or Cisco products using the so-called Multi-VRF feature ("Building Trusted VPNs with Multi-VRF)".

Thus the most commonly used VPN technology, BGP/MPLS VPN, relies on MPLS functionality in the PE routers. The alternative is to use a virtual router approach, which eliminates the LSP requirement for the inner header. However, it has scalability limitations since, for each VPN, a different routing instance 31 (a different routing daemon) runs in the PE router. Moreover it requires the manual configuration of the inner tunnels 32 (an IP-in-IP or a GRE tunnel needs the configuration of two tunnel endpoint virtual interfaces, both of them with at least 3 parameters), which enormously increases the configuration complexity compared to BGP/MPLS VPN. The Multi-VRF solution does not require the configuration of bi-directional tunnels, but suffers from similar scalability limitations to the virtual router concept. In addition, it requires that the PE routers are directly connected with a L2 Ethernet network.

SUMMARY

In accordance with a first aspect of the technology described herein there is provided a method for setting up a VPN in a backbone network having a plurality of PE routers for controlling the transfer of IP traffic to and from CE routers in satellite networks. In a PE router, a VRF is configured for the VPN and populated with local routes for the VPN. A PE IP address is assigned for the PE, and a VRF IP loopback address is assigned for the VRF. A local route with the PE and VRF IP loopback addresses is then advertised to other PE routers in the backbone network.

Thus each VPN has a dedicated VRF, and other PE routers in the backbone network can identify the correct PE by using the PE IP loopback address, and the VRF by using the VRF IP loopback address.

The local routes may be populated from a customer site which is directly connected to the PE router. This process may be carried out manually or dynamically using standard routing protocols.

Other PE routers in the backbone network can then receive the advertised local route with VRF and PE IP loopback addresses, and populate local VRFs with the local route. The advertisement may be carried out using Border Gateway Protocol with Multiprotocol Extensions "MP-BGP"

Preferably the PE router encapsulates IP packets relating to the VPN before forwarding the encapsulated packets through the backbone network. The encapsulation may be carried out using IP-in-IP, IPSec or GRE, for example.

The encapsulation preferably includes the addition of one or more encapsulation headers to encapsulated IP packets, the encapsulation header(s) including the VRF and PE IP loopback addresses. The encapsulation may be a double encapsulation so that each IP packet has an inner IP header and an outer IP header, the inner IP header including the VRF IP loopback address, and the outer IP header including the PE IP loopback address. Alternatively, the encapsulation may provide a single header including the VRF IP loopback address as a source IP address and a destination PE IP loopback address for an egress PE router as a destination IP address.

In accordance with a second aspect of the technology described herein there is provided a PE router for controlling the transfer of IP traffic between a backbone network and CE routers in satellite networks. The PE router comprises a processor arranged to configure a VRF for a VPN, populate the VRF with local routes for the VPN and assign a VRF IP loopback address for the VRF and a PE IP loopback address for the PE router. The PE router also comprises a storage medium for storing the VRF, and a transmitter arranged to advertise a local route with the PE and VRF IP loopback addresses to other PE routers in the backbone network.

In accordance with a third aspect of the technology described herein there is provided a network for supporting a VPN. The network comprises a backbone network comprising a plurality of PE routers, and a plurality of satellite networks, each having at least one CE router operatively connected to a PE router in the backbone network. A PE router maintains a VRF for the VPN, the VRF being populated with local routes for the VPN. A PE IP loopback address is assigned for the PE router, and a VRF IP loopback address is assigned for the VRF. A local route with the VRF and PE IP loopback addresses is advertised to other PE routers in the backbone network.

Where a message is stated as being sent from or to a particular node, for example, it is to be understood that this is intended as including the case where the message is not sent directly from or to the particular node, but via other nodes as well.

According to a fourth aspect of the technology described herein there is provided apparatus for use in a network, the apparatus comprising means for performing a method according to the first aspect of the technology described herein.

According to a fifth aspect of the technology described herein there is provided a program for controlling an apparatus to perform a method according to the first aspect of the technology described herein or which, when loaded into an apparatus, causes the apparatus to become an apparatus according to the fourth aspect of the technology described herein. The program may be carried on a carrier medium. The carrier medium may be a storage medium. The carrier medium may be a transmission medium.

According to a sixth aspect of the technology described herein there is provided an apparatus programmed by a program according to the fifth aspect of the technology described herein.

According to a seventh aspect of the technology described herein there is provided a storage medium containing a program according to the fifth aspect of the technology described herein.

DETAILED DESCRIPTION

Figure 4:
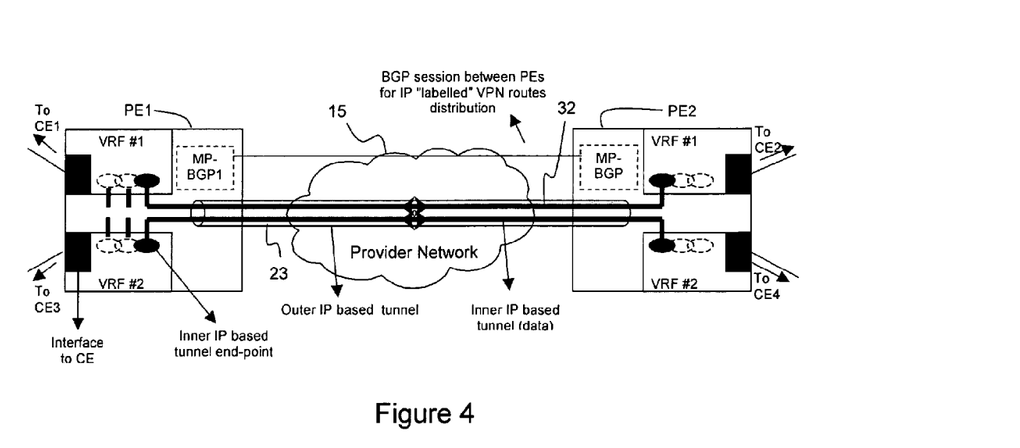
FIG. 4 is a schematic illustration of a BGP-IP VPN architecture.

FIG. 4 is a schematic illustration of a BGP-IP VPN architecture, As before, each PE router PE1, PE2 maintains one or more forwarding tables (VRF) for each VPN. In this example each PE router has a VRF #1 and VRF #2 for the VPNS #1 and #2 respectively. This is similar to the situation for the BGP/MPLS VPN approach described above. Each VRF is populated with customer routes using manually entered static routes using e.g. RIPv2, OSPF or eBGP, and the local customer routes are advertised to other PE routers using the MP-BGP protocol, as described in RFC 2283.

In the BGP/MPLS VPN approach previously described, the advertisement messages of the MP-BGP protocol contain MPLS labelled VPN-IPv4 routes. MP-BGP for BGP/MPLS VPN advertises the following information:
PE loopback address (as the next-hop)
VPN-IPv4 address prefix:
  Route distinguisher, which includes an ID of the VPN customer (8 bytes)
  IP address prefix (4 bytes)
MPLS label (which identifies the VPN-IPv4 address prefix or the VRF)

Figure 5:
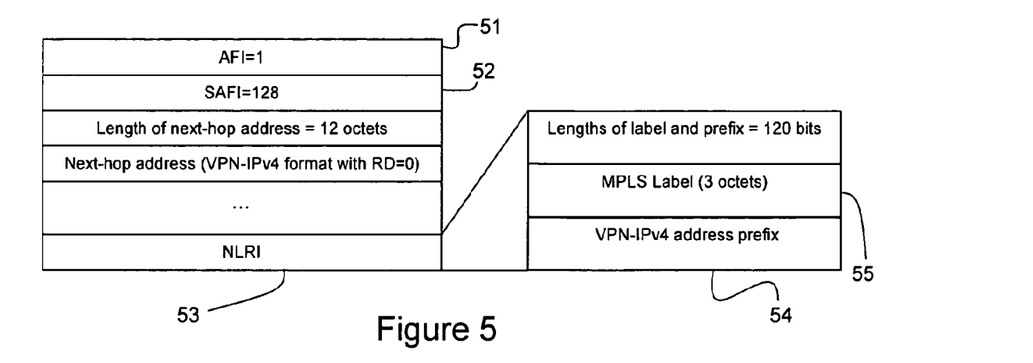
FIG. 5 illustrates the Multiprotocol Extension attribute for a BGP/MPLS VPN.

FIG. 5 illustrates how this information is included in the Multiprotocol extension optional attribute (RFC 2283). The Address Family Identifier (AFI) field 51 is set to 1 and the Subsequent Address Family Identifier (SAFI) field to is set to 128. These values confirm that the Network Layer Reachability Information (NLRI) field 53 contains a VPN-IPv4 address 54 labelled using an MPLS label 55 (RFC 3107).

In the BGP-IP architecture, instead of the MPLS label 55, IP addresses are used to identify the VRF that should be used for a specific VPN. This is illustrated with reference to FIG. 6. The IP addresses used to identify the correct VRF are addresses of loopback interfaces 65, assigned for each VRF in a PE router. In other words, each VRF is configured with a loopback interface. These interfaces can be configured manually, or alternatively the configuration can be automated each time VRF is created. In a PE router the loopback address associated with each VRF must be unique. The loopback addresses are advertised in the PE routers, but not the P routers P1-P4, in the providers' backbone.

Figure 6:
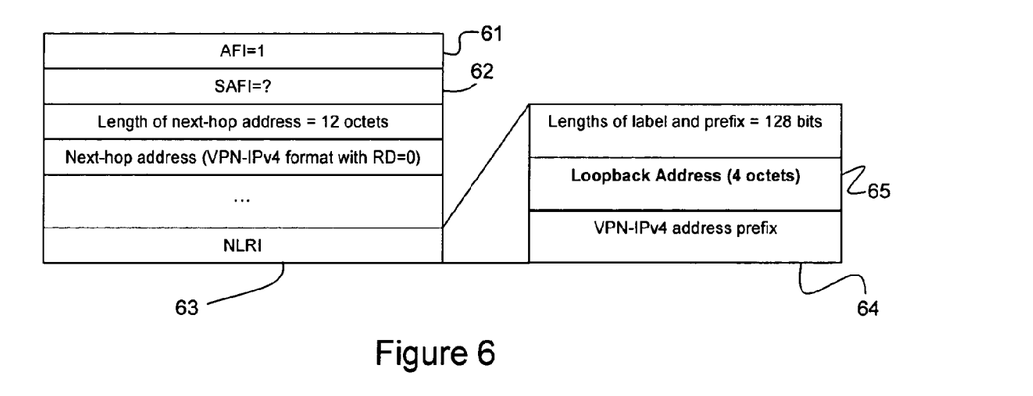
FIG. 6 illustrates the Multiprotocol Extension attribute for a BGP-IP VPN.

The information to be advertised is the following:
PE loopback address (as the next-hop)
VPN-IPv4 address prefix (12 bytes)
  Route distinguisher (8 bytes)
  IP address prefix (4 bytes)

VRF loopback address 65 (which identifies the VRF instance to be used for this specific VPN).

It will also be noted from FIG. 6 that a new SAFI code 61 and a new NLRI format will be required.

When this kind of MP-BGP advertisement is received by a PE router, it will:
populate the VRFs with the customer routes; and
bind the customer routes to an encapsulation interface that will encapsulate all customer packets and add an encapsulation header so that
  the encapsulation header's destination points to the PE next-hop (the PE loopback interface address received in the message), and
  it fills into the encapsulating header the loopback address of the egress PE router's appropriate VRF.

Besides the configuration of loopback addresses, the PE configurations will be the same as those used for the BGP/MPLS VPN method. After starting BGP sessions between PE nodes, the protocol will automatically advertise the IP "labelled" routes of VRFs and will automatically configure the required IP-in-IP, IPSec or GRE tunnels.

Assuming that the VRFs have been populated with remote VPN routes based on the new MP-BGP messages, and the required tunnels have been configured, the packet forwarding will happen as follows. Based on the incoming VPN site (e.g. VPN #2, see FIG. 4), the ingress PE router PE1 chooses the proper VRF (VRF #2) in order to find the next-hop PE based on the packet's destination address. If the next-hop address is a different PE router, IP-in-IP, IPSec or GRE encapsulation is used, with the loopback address of the egress PE router PE2 as the destination address. Two methods are possible to encode the VPN identity, i.e. the per-VRF loopback address, into the packet.

Figure 7:
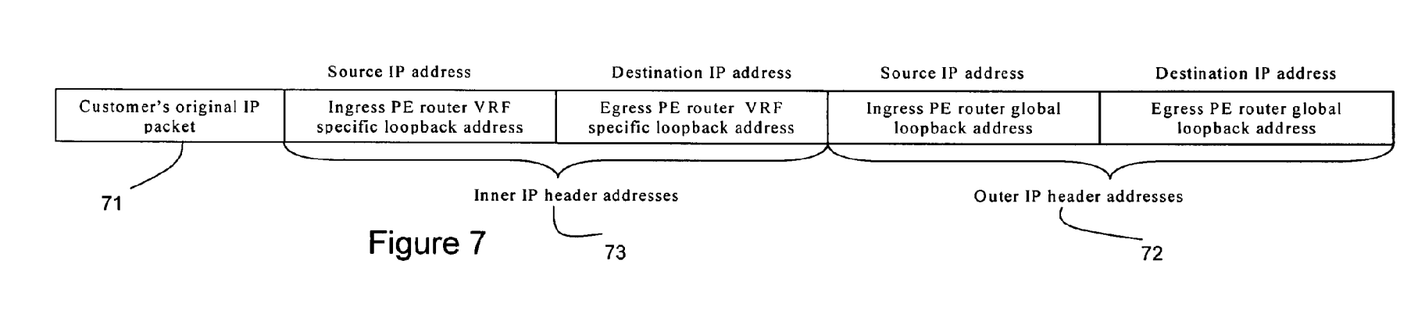
FIG. 7 illustrates a double encapsulated IP packet.

The first method is illustrated in FIG. 7. In this method the original IP packet 71 is double encapsulated. It uses two IP headers: an outer IP header 72 to route the packet to the appropriate egress PE router PE2, and an inner IP header 73 to find the appropriate VRF (e.g. the VRF #2) in the egress PE2.

Figure 8:
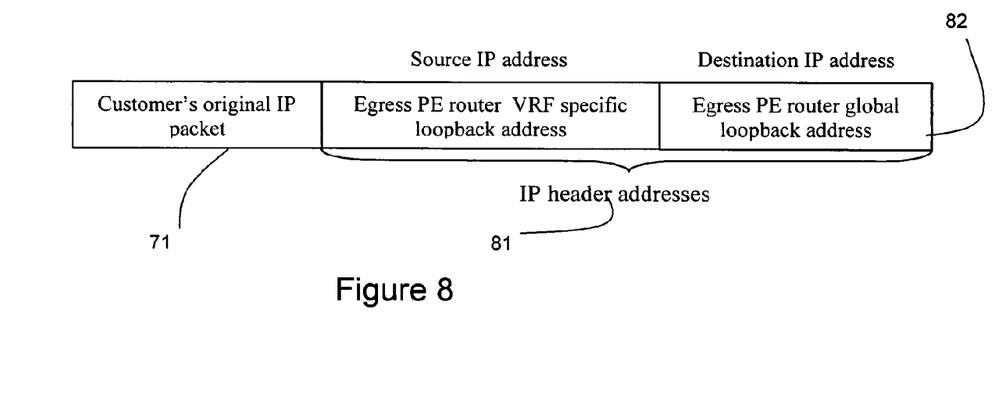
FIG. 8 illustrates a single encapsulated IP packet.

This method generates an overhead of two IP headers. However, IP uses destination-based forwarding, i.e. the two source IP addresses are superfluous information. The second method is illustrated in FIG. 8, and in this method only single encapsulation is used. In this case, one IP header 81 is used, with destination address 82 set to the PE loopback address of the egress PE router PE 2, and the source address 83 set to the VRF related loopback address (for VRF #2) at the egress router PE2.

The egress PE router PE2 requires a function, similar to policy based routing, where after decapsulation, the packet is routed using the external header's source address into the appropriate VRF. Once in the VRF, the customer packet can be routed based on the original IP packet destination address.

Figure 9:
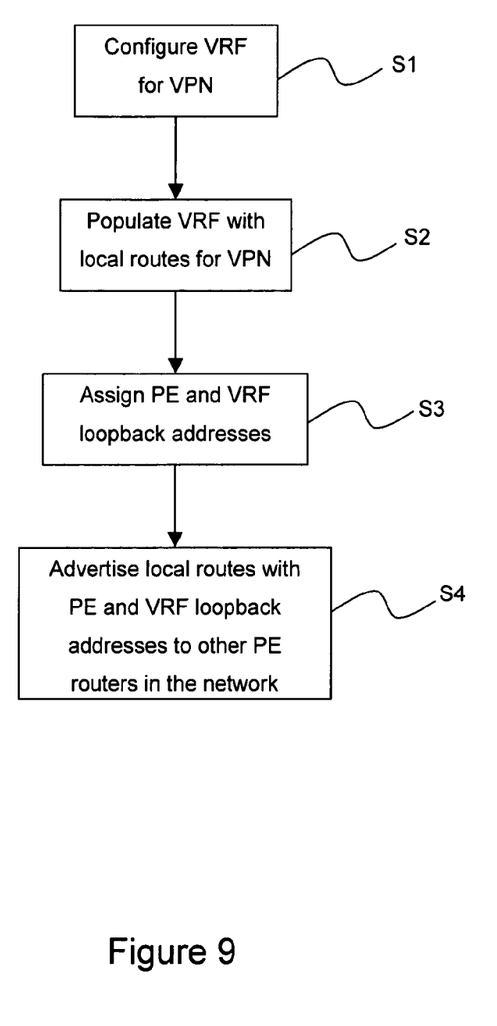
FIG. 9 is a flow chart illustrating the actions taken by an ingress PE router.

The actions taken by the ingress PE router to advertise the VPN routes are illustrated in FIG. 9, as follows:

S1: When a VPN is configured, a VRF is configured at the ingress PE router for that VPN.

S2: The VRF is populated with local routes for that VPN.

S3: PE and VRF loopback addresses are assigned. The PE loopback address should be unique to the backbone network, so that each PE router has a different PE loopback address. The VRF loopback address is unique to the individual VRF, and thus unique to each VPN.

S4: Local routes with the PE and VRF loopback addresses are advertised to other PE routers in the backbone network using MG-BGP.

Figure 10:
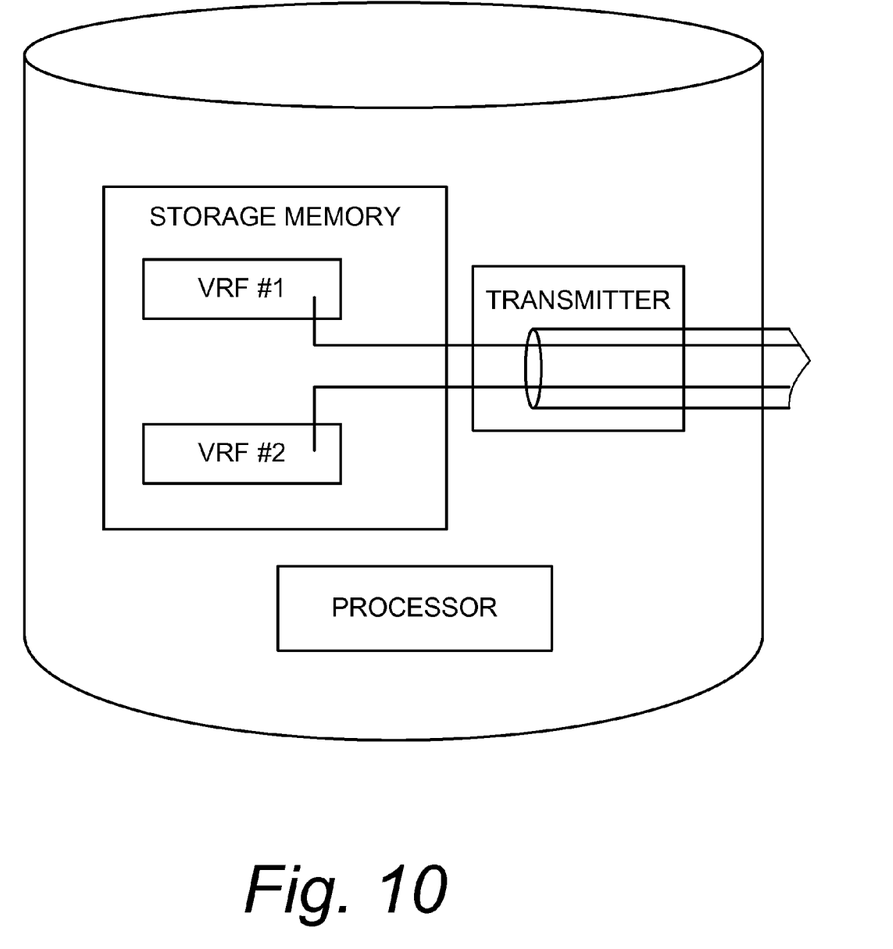
FIG. 10 is a schematic view of an example PE router.

FIG. 10 shows an example PE router as comprising a storage medium; a transmitter; and a processor. The storage medium stores. e.g., the Virtual Routing and Forwarding Table "VRF" for a Virtual Private Network "VPN". The transmitter is arranges to advertise a local route with the PE IP loopback address and the VRF IP loopback address to other PE routers in the backbone network. The processor is arranged to encapsulate IP packets relating to the VPN and add one or more encapsulation headers to each IP packet before forwarding the IP encapsulated packets through the backbone network.

Previous PE based provider provisioned L3 VPN solutions either assume MPLS capabilities at least in PE routers, or require per-VPN routing daemons in PE routers. The arrangements described above enable the implementation of L3 VPN using pure IP technology and a new MP-BGP message type with the same configuration simplicity as in the BGP/MPLS VPN. These arrangements thus offer the best of the two previously known L3 VPN variant Virtual Routers (featuring the potential of pure IP implementation) and BGP/MPLS VPN (featuring ease of management and low overhead).

It will be appreciated that operation of one or more of the above-described components can be controlled by a program operating on the device or apparatus. Such an operating program can be stored on a computer-readable medium, or could, for example, be embodied in a signal such as a downloadable data signal provided from an Internet website. The appended claims are to be interpreted as covering an operating program by itself, or as a record on a carrier, or as a signal, or in any other form.

It will also be appreciated by the person of skill in the art that various modifications may be made to the above-described embodiments without departing from the scope of the technology described herein as defined by the appended claims.

The invention claimed is:

1. A method for setting up a Virtual Private Network 'VPN" in a backbone network having a plurality of Provider Edge "PE" routers for controlling the transfer of IP traffic to and from Customer Edge "CE" routers in satellite networks, the method comprising:
    in a PE router, configuring a Virtual Routing and Forwarding Table "VRF" for the VPN and populating the VRF with local routes for the VPN;
    assigning a PE IP Ioopback address for the PE router,
    assigning a VRF IP loopback address for the VRF;
    advertising a local route with the VRF loopback address and the PE IP Loopback address to other PE routers in the backbone network;
    encapsulating IP packets relating to the VPN;
    adding one or more encapsulation headers to each IP packet, the one or more encapsulation headers including the VRF loopback address and the PE IP loopback address; and
    forwarding the IP encapsulated packets through the backbone network.

2. The method of claim 1, wherein another PE router in the backbone network receives an advertised local route with the VRF loopback address and the PE IP loopback address and populates a local VRF with the local route.

3. The method of claim 1, wherein an advertisement of the local route with the VRF loopback address and the PE IP Loopback address is carried out using Border Gateway Protocol with Multiprotocol Extensions "MP-BGP".

4. The method of claim 1, wherein the encapsulation of the IP packets is carried out using IP-in-IP, IPSec or GRE.

5. The method of claim 1, wherein each IP packet has an inner IP header and an outer IP header, the inner IP header including the VRF IP loopback address, and the outer IP header including the PE IP loopback address.

6. The method of claim 1, wherein a single header includes the VRF IP loopback address as a source IP address and a destination PE IP loopback address for an egress PE router as a destination IP address.

7. A Provider Edge "PE" router for controlling the transfer of IP traffic between a backbone network and Customer Edge "CE" routers in satellite networks, the PE router having PE IP loopback address, the PE router comprising:
    a storage medium for storing a Virtual Routing and Forwarding Table "VRF" for a Virtual Private Network "VPN" which is populated with local routes for the VPN and assigned a VRF IP loopback address for the VRF;
    a transmitter arranged to advertise a local route with the PE IP loopback address and the VRF IP loopback address to other PE routers in the backbone network,
    a processor arranged to encapsulate IP packets relating to the VPN and add one or more encapsulation headers to each IP packet before forwarding the IP encapsulated packets through the backbone network, the one or more encapsulation headers containing the PE and VRF IP loopback addresses.

8. The PE router of claim 7, wherein the transmitter is arranged to provide an advertisement that is carried out using Border Gateway Protocol with Multiprotocol Extensions "MP-B GP".

9. The PE router of claim 7, wherein the processor is arranged to carry out encapsulation of the IP packets using IP-in-IP, IPSec or GRE.

10. The PE router of claim 7, wherein each IP packet has an inner IP header and an outer IP header, the inner IP header including the VRF IP loopback address, and the outer IP header including the PE loopback address.

11. The PE router of claim 7, a single header includes the VRF IP loopback address as a source IP address and a destination PE IP loopback address for an egress PE router as a destination IP address.

12. The PE router of claim 7, the processor being arranged to receive a further advertised local route with a VRF loopback address and a PE IP loopback address from another PE router in the network, the processor being further arranged to populate a further VRF with the further local route.

13. A network for supporting a Virtual Private Network "VPN", the network comprising:
    a backbone network comprising a plurality of Provider Edge "PE" routers; and
    a plurality of satellite networks, each having at least one Customer Edge "CE" router operatively connected to a PE router in the backbone network; wherein:
    a PE router comprises a Virtual Routing and Forwarding Table "VRF" for the VPN, the VRF being populated with local routes for the VPN;
    a PE IP loopback address is assigned for the PE router;
    a VRF IP loopback address is assigned for the VRF;
    a local route with the VRF loopback address and the PE IP loopback address is advertised to other PE routers in the backbone network; and
    the PE router is configured to encapsulate IP packets relating to the VPN and add one or more encapsulation headers to each IP packet before forwarding the IP encapsulated packets through the backbone network, the one ormore encapsulation headers including the VRF loopback address and the PE IP loopback address.

14. The network of claim 13, wherein another PE router is configured to receive the advertised local route with the VRF loopback address and the PE IP loopback address and populate a local VRF with the local route.

15. The network of claim 13, wherein an advertisement of the local route with the VRF loopback address and the PE IP loopback address is carried out using Border Gateway Protocol with Multiprotocol Extensions "MP-BGP".

16. The network of claim 13, wherein the encapsulation of the IP packets is carried out using IP-in-IP, IPSec or GRE.

17. The network of claim 13, wherein each IP packet has an inner IP header and an outer IP header, the inner IP header including the VRF IP loopback address, and the outer IP header including the PE IP loopback address.

18. The network of claim 13, wherein a single header including the VRF IP loopback address as a source IP address and a destination PE IP loopback address for an egress PE router as a destination IP address.

19. A non-transitory computer-readable medium storing program instructions which, when executed by apparatus perform the following:
    configure a Virtual Routing and Forwarding Table "VRF" for the VPN and populate the VRF with local routes for the VPN;
    assign a PE IP loopback address for the PE router,
    assign a VRF IP loopback address for the VRF;
    advertise a local route with the VRF loopback address and the PE IP Loopback address to other PE routers in the backbone network;
    encapsulate IP packets relating to the VPN;
    add one or more encapsulation headers to each IP packet, the one or more encapsulation headers including the VRF loopback address and the PE IP loopback address; and
    forward the IP encapsulated packets through the backbone network.

20. The non-transitory computer-readable medium of claim 19, wherein the program instructions, when executed, further advertise the local route using Border Gateway Protocol with Multiprotocol Extensions "MP-BGP".

21. The non-transitory computer-readable medium of claim 19, wherein the program instructions, when executed, further encapsulate the IP packets out using IP-in-IP, IPSec or GRE.

22. The non-transitory computer-readable medium of claim 19, wherein the program instructions, when executed, further provide each IP packet with an inner IP header and an outer IP header, the inner IP header including the VRF IP loopback address, and the outer IP header including the PE IP loopback address.

* * * * *

UNITED STATES PATENT AND TRADEMARK OFFICE
CERTIFICATE OF CORRECTION

PATENT NO. : 8,761,043 B2
APPLICATION NO. : 12/811758
DATED : June 24, 2014
INVENTOR(S) : Papp et al.

It is certified that error appears in the above-identified patent and that said Letters Patent is hereby corrected as shown below:

In the Specification

Column 5, Line 16, delete "packet; and" and insert -- packet; --, therefor.

Column 5, Line 18, delete "PE router." and insert -- PE router; and --, therefor.

Column 5, Lines 23-24, delete "architecture, As" and insert -- architecture. As --, therefor.

Column 5, Line 47, delete "to is set to" and insert -- is set to --, therefor.

Column 7, Line 3, delete "stores." and insert -- stores, --, therefor.

Column 7, Line 5, delete "arranges to" and insert -- arranged to --, therefor.

In the Claims

Column 7, Line 38, in Claim 1, delete ""VPN"" and insert -- "VPN" --, therefor.

Column 7, Line 46, in Claim 1, delete "Ioopback" and insert -- loopback --, therefor.

Column 7, Line 46, in Claim 1, delete "router," and insert -- router; --, therefor.

Column 8, Line 15, in Claim 7, delete ""VRF"" and insert -- "VRF" --, therefor.

Column 8, Line 30, in Claim 8, delete ""MP-B GB"." and insert -- "MP-BGB". --, therefor.

Column 8, Line 66, in Claim 13, delete "ormore" and insert -- or more --, therefor.

Signed and Sealed this
Third Day of March, 2015

Michelle K. Lee
*Deputy Director of the United States Patent and Trademark Office*

Column 9, Line 13, in Claim 17, delete "Ioopback" and insert -- loopback --, therefor.

Column 9, Line 16, in Claim 18, delete "Ioopback" and insert -- loopback --, therefor.

Column 9, Line 25, in Claim 19, delete "Ioopback" and insert -- loopback --, therefor.

Column 9, Line 25, in Claim 19, delete "router," and insert -- router; --, therefor.